United States Patent
Lilley

(10) Patent No.: US 6,220,969 B1
(45) Date of Patent: Apr. 24, 2001

(54) CLAMPLESS UNIVERSAL JOINT AND BOOT ASSEMBLY

(75) Inventor: Albert Lilley, Hillsdale (CA)

(73) Assignee: St. Louis Stamping Inc., Barrie (CA)

( * ) Notice: Subject to any disclaimer, the term of this patent is extended or adjusted under 35 U.S.C. 154(b) by 0 days.

(21) Appl. No.: 09/134,534

(22) Filed: Aug. 14, 1998

(51) Int. Cl.$^7$ ..................................... F16C 1/26
(52) U.S. Cl. ..................... 464/173; 277/637; 403/381
(58) Field of Search ........................... 464/173, 175; 403/50, 51, 326, 381; 277/634, 636, 637; 49/489.1; 74/18, 18.1, 18.2; 285/235

(56) References Cited

U.S. PATENT DOCUMENTS

| | | | | |
|---|---|---|---|---|
| 1,871,883 | * | 8/1932 | Geyer | 403/51 X |
| 1,998,791 | * | 4/1935 | Schanz | 277/637 X |
| 2,283,139 | * | 5/1942 | Herget | 74/18.1 X |
| 2,544,541 | * | 3/1951 | McCarthy et al. | 403/50 |
| 2,718,677 | * | 9/1955 | Cornell | 49/489.1 X |
| 2,898,750 | * | 8/1959 | DeLorean | 464/173 X |
| 3,029,481 | * | 4/1962 | Henniges | 49/489.1 X |
| 3,309,096 | * | 3/1967 | Inka | 403/292 X |
| 3,502,004 | * | 3/1970 | Schrader | 74/18.2 X |
| 3,683,421 | * | 8/1972 | Martinie | 277/636 X |
| 3,762,740 | * | 10/1973 | Cass | 277/636 |
| 4,173,362 | * | 11/1979 | Glover et al. | 285/235 X |
| 4,676,513 | * | 6/1987 | Tiegs et al. | 403/51 X |
| 4,685,686 | * | 8/1987 | Weiler | 74/18.1 X |
| 5,105,509 | | 4/1992 | Lilley . | |
| 5,176,390 | * | 1/1993 | Lallement | 464/175 X |
| 5,248,169 | * | 9/1993 | Barbe et al. | 285/235 X |
| 5,431,601 | * | 7/1995 | Nakamura | 464/175 |
| 5,692,962 | * | 12/1997 | Fukumura et al. | 464/173 |
| 5,768,752 | | 6/1998 | Oetiker . | |
| 6,093,108 | * | 7/2000 | Moulinet | 464/173 |

FOREIGN PATENT DOCUMENTS

| | | | |
|---|---|---|---|
| 1286094 | 7/1991 | (CA) . | |
| 2935003 | * | 12/1980 | (DE) ..................... 403/50 |

* cited by examiner

Primary Examiner—Lynne H. Browne
Assistant Examiner—Greg Binda
(74) Attorney, Agent, or Firm—Gowling Lafleur Henderson Strathy

(57) ABSTRACT

A universal joint such as a constant velocity (CV) joint in a drive assembly of a front wheel drive vehicle can require a boot to seal the joint from environmental contaminants found on a highway or other vehicle driving surface. Typically, such boots are attached using a clamp, however it has been found that the crimps extending from the clamp can interfere with a vehicle's ABS sensor. The present invention provides a clampless means of attaching the boot to the CV joint, by providing a continuous rib projecting from inner surface of an end of the boot, and a coincident groove on the end of the universal joint, wherein the rib has a means for cooperating with the groove to retain said rib within the groove. It is contemplated that the present invention can be used on other types of universal joint and boot assemblies.

6 Claims, 3 Drawing Sheets

CLAMPLESS UNIVERSAL JOINT AND BOOT ASSEMBLY

FIELD OF INVENTION

This invention relates to universal joint seals and more particularly relates to a clampless boot for sealing a universal joint such as a constant velocity joint.

BACKGROUND OF THE INVENTION

In the early 1980's the automotive industry began to switch production from rear wheel drive vehicles to front wheel drive vehicles. Generally, front wheel drive passenger vehicles are now more common than rear wheel drive vehicles. This change resulted in a significant redesign of vehicle drive systems. Today, front wheel drive vehicles typically have two driveaxles, one to connect each front wheel with the vehicle transmission. In four wheel drive and independent rear suspension vehicles the automobile can have four driveaxles. Each driveaxle typically requires two constant velocity (CV) joints, a type of universal joint, to allow for movement of the driveaxles in relation to the transmission as the vehicle wheels encounter uneven terrain.

Because of the proximity of the CV joints to a highway or road, CV joints require a flexible 'boot', which is attached over the joint to protect it from stones, debris and other external contaminants while retaining lubricants and maintaining integrity of the precision internal bearing surfaces of the CV joint. It is well known in the prior art to use band clamps for the attachment of boots to CV joints, and crimp-style clamps have been the preferred means for attaching boots for the past decade. Crimp-style clamps have an outwardly projecting deformable crimp lug by which the clamp is installed, as described in U.S. Pat. No. 5,105,509. This method is favoured for its simplicity as a mechanical means to retain and seal the boot to the CV joint.

More recently, anti-lock braking systems (ABS) have been installed on vehicles to provide improved vehicle braking. Originally, such a safety device was mainly installed in higher priced vehicles, but ABS is now becoming a standard installation on many vehicles. On front wheel drive vehicles, anti-lock braking systems have an ABS wheel position ring encircling the CV joint adjacent the wheel, and an ABS sensor suspended from the vehicle chassis mounted proximate the position ring so as monitor wheel rotation. This location is disadvantageous as it is typically adjacent the crimp-style clamp affixing the boot. The positioning of the ABS sensor greatly reduces the amount of radial clearance available around the CV joint to which the crimp-style clamp is installed, creating a risk of interference between the crimped clamp and the ABS sensor. Such interference can damage the sensor during wheel rotation while the vehicle is operating. Similarly, affixing a crimp style clamp during a repair of the vehicle could result in inadvertent damage to the sensor and render the ABS inoperative.

The reduced clearance necessary for the ABS sensor has forced the development of lower profile crimps on crimp-style clamps. For example, Canadian Patent No. 1,286,094 discloses an earless or lugless clamp structure. However, at the original equipment manufacturer (O.E.M.) level these lower profile crimp style clamps can be only utilized when softer boot compounds are used, due to their inherent lower crimping loads. Generally, the use of a clamp results in greater complexity and cost in the assembly of the vehicle, and raise the likelihood of damage to the ABS sensor during replacement.

A further disadvantage to the use of clamps to affix boots to CV Joints has arisen due to new materials now used to manufacture boots. It is well known in the art to mould boots from neoprene, however, it has been determined that neoprene is susceptible to damage from heat from the vehicle's engine, which can lead to premature deterioration of the boot Silicone has also been commonly used, but more recently, Hytrel®, a product of Dupont Chemical Inc. is being used for its superior resilience to vehicle engine heat and imperviousness to debris and other environmental contaminants present on highways and other vehicle driving surfaces. While Hytrel® is proving to be a superior material for CV boots, it's properties require a high pressure to adequately secure the boot to the CV joint. Thus, in order to provide low profile clamps with sufficient crimping pressure, it is now commonplace to use a swage ring or compression ring as described in U.S. Pat. No. 5,768,752, which further increases the complexity of vehicle design and assembly.

It will be apparent that other universal joints can suffer from some of the foregoing disadvantages. For example, the rack and pinion steering unit universal joint is also located near to the vehicle driving surface, thereby necessitating a protective boot.

SUMMARY OF THE INVENTION

It is therefore an object of the present invention to provide a novel means to attach a boot to a universal joint that obviates or mitigates at least one of the disadvantages of the prior art.

In a first, broadest aspect of the present invention a universal joint and boot assembly is provided. The universal joint is comprised of a first and second member engaging one another to transmit torque between the members. The first member has a circumferential groove formed on its exterior. The assembly also includes a boot for sealing the engagement between the first and second members of the universal joint The boot comprises a flexible hollow body with a continuous rib extending from an inner surface of the body, and the rib is formed in any suitable fashion so as to be received within the groove on the first member, such that the boot is sealed to the first member. The boot can be sealed to the second member using the aforementioned rib and groove configuration, or any other conventional means well known in the art can be used.

In a preferred embodiment of the first aspect of the present invention, the universal joint is a constant velocity joint, such as those commonly found on the driveshafts between the transmission and the front-wheels of a front wheel drive vehicle.

In another preferred embodiment of the first aspect, the rib on the boot comprises a rectilinear throat and an arrow-shaped head, and the groove on the first member of the universal joint comprises a wider portion complementary to the head and a narrow portion complementary to the throat.

In another preferred embodiment of the first aspect, the rib on the boot comprises a rectilinear throat and a cylindrical head, and the groove comprises a wider portion complementary to the head and narrow portion complementary to the throat.

In another preferred embodiment of the first aspect, the universal joint is a universal joint on a rack and pinion steering system. Such a universal joint is commonly the double-yoke style as is well known in the art, and it will be appreciated that the first member, ie. the first yoke, of the universal joint has suitable surface for a circumferential groove.

In a second broad aspect of the present invention, a boot for sealing a universal joint is provided. The universal joint has a first and second member for transmitting torque therebetween, and the first member has a circumferential groove. The boot comprises a flexible hollow body and a continuous rib extending from an inner surface of the body. The rib on the body is coincident with the groove when the boot is positioned on the universal joint, and the rib cooperates with the groove to maintain the boot in position on the universal joint.

In a third broad aspect of the present invention, a universal joint and boot assembly is provided. The universal joint comprises a first and second member engaging one another to transmit torque therebetween, and the first member has a circumferential rib. The boot for sealing the engagement between the first and second members has a flexible hollow body with a continuous groove in an inner surface of the body of the boot, and the rib is designed as as to be received in the groove such that said boot is sealed to the first member.

DESCRIPTION OF THE DRAWINGS

Presently preferred embodiments of the invention will now be described by way of example only with reference to the attached figures wherein.

DETAILED DESCRIPTION OF THE DRAWINGS

Figure 1:
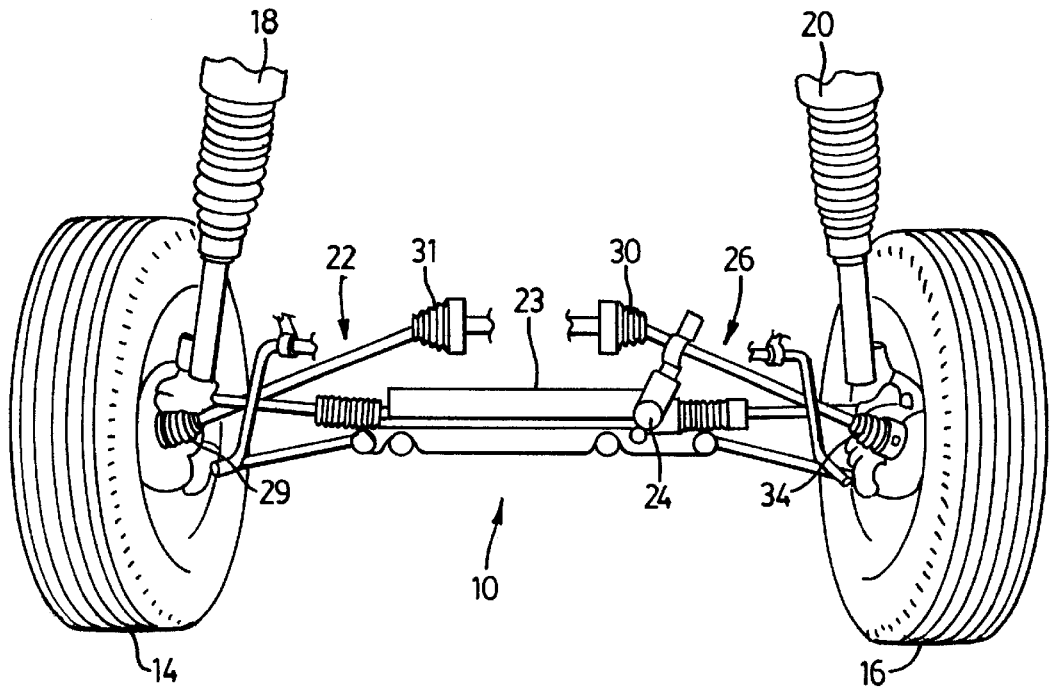
FIG. 1 is a perspective view of a typical front end drive assembly of a front wheel drive vehicle.

Referring to FIG. 1, a front end suspension and drive assembly of a front wheel drive vehicle is indicated generally at 10. Drive assembly 10 is comprised of spring-shock assemblies 18, 20 for dampening vibration during operation of the vehicle over uneven terrain. Spring-shock assembly 18, 20 connects at one end to a vehicle chassis (not shown), while the opposite end attaches to a fixed point adjacent to a wheel 14,16. Wheel 14, 16 is rotated by torque received from a driveaxle 22,26. It should be noted that in the present embodiment driveaxles 22 and 26 are identical, but for purposes of the describing the present invention each will be referred to separately. In turn, each driveaxle 22, 26 receives torque from a transmission (not shown). If present in FIG. 1, the transmission would be located intermediate driveaxles 22, 26. Driveaxles 22, 26 comprise universal joint and boot assemblies 29, 31, 30 and 34 respectively, to provide continuous rotation of wheels 14, 16 by the transmission during operation of the vehicle over uneven terrain.

Drive assembly 10 also comprises rack and pinion steering box 23 for providing steering control of wheels 14, 16. A gear rack (not shown) in steering box 23 is connected to a pinion for connection to a steering wheel via a universal joint 24. As will be explained in greater detail below, the various aforementioned universal joints within drive assembly 10 are ideally suited to the present invention.

Figure 2:
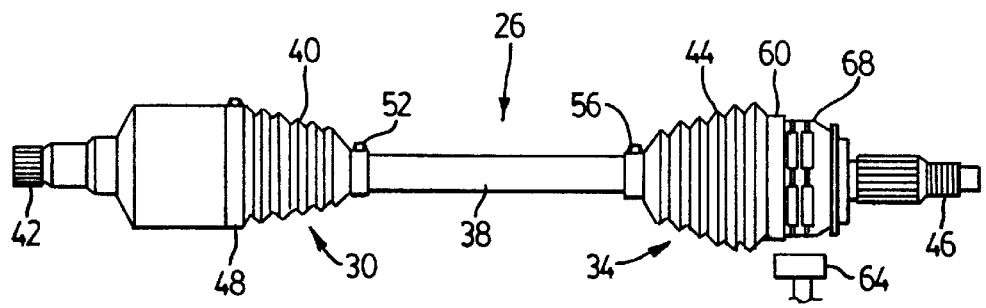
FIG. 2 is a plan view of one of the driveshafts of the assembly of FIG. 1.

Referring now to FIG. 2, driveaxle 26 is shown in a plan view. Driveaxle 26 comprises inner universal joint and boot assembly 30 and outer universal joint and boot assembly 34 at opposite ends of a main shaft 38. Inner universal joint and boot assembly 30 connects via inner splined shaft 42 to the transmission, while outer universal joint and boot assembly 34 connects via outer splined shaft 46 to wheel 16.

An ABS sensor 64 is suspended from the vehicle chassis so as to be proximate a pair of ABS wheel position rings 68, which encircle outer universal joint and boot assembly 34 between an outer edge 60 of boot 44 and outer splined shaft 46. ABS sensor 64 is proximate rings 68 to detect wheel rotation but is free from interference with universal joint and boot assembly 34.

Universal joint and boot assemblies 30,34 each comprise a boot 40, 44, which each seal and cover a universal joint 32,36. Clamps 48, 52 affix boot 40 to inner boot and universal joint assembly 30. However, outer universal joint and boot assembly 34 only has a shaft clamp 56, while outer edge 60 is affixed without a clamp in accordance with the present invention.

Figure 3:
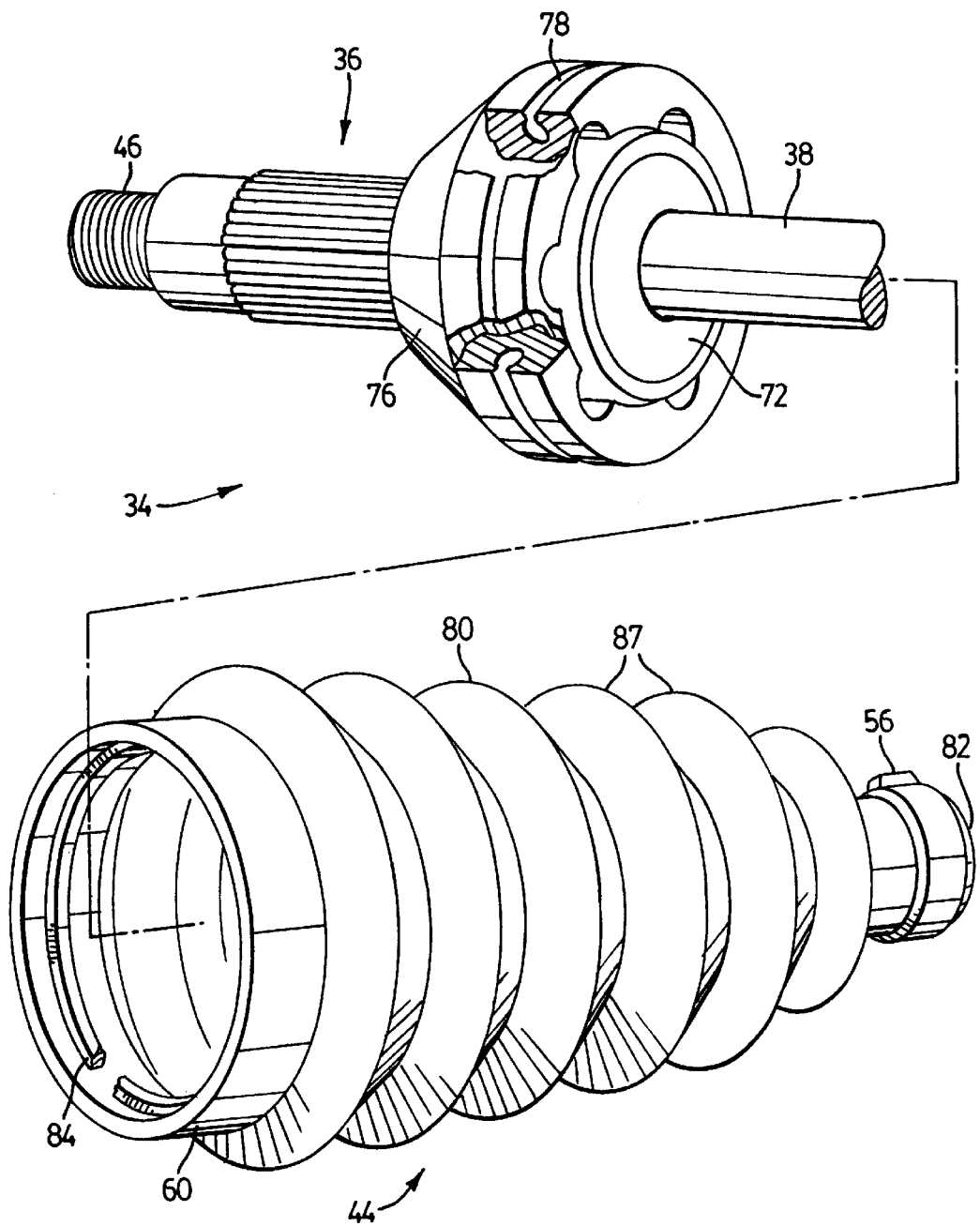
FIG. 3 is an exploded perspective view of a portion of the clampless universal joint boot assembly of the present invention.

Accordingly, the clampless means of attachment of outer edge 60 of boot 44 to universal joint 36 is shown in FIG. 3. Universal joint 36, which in the present embodiment is a CV joint, comprises a first member 72 and a second member 76, pivotable in angular relation thereto while transmitting torque from first member 72 to second member 76. First member 72 is integral with main shaft 38, while second member 76 is attached to wheel 16. Universal joint 36 further comprises a groove 78 extending circumferentially about second member 76. Groove 78 can be machined into second member 76 in any manner known in the art, such as a numerically controlled turning operation, and can be incorporated into an existing machining process of universal joint 36.

Boot 44 has a flexible hollow body 80 which in the present embodiment is conical and comprises a narrow end 82 which is attached to first member 72 with clamp 56. It will be appreciated by persons skilled in the art that clamp 56 is any conventional clamp as is well known in the art. Bellows 87 are provided along body 80 for flexibility during rotation and angular displacement of first member 72 and second member 76. A continuous rib 84 coincident with groove 78 protrudes about the inner surface of outer edge 60 of boot 44. As is well known in the art, boot 60 can be formed by blow moulding or any other suitable method and can be made from silicone, neoprene or any other suitable material that provides a seal and flexibility during rotation and bending of universal joint 36. In a presently preferred embodiment, however, boot 60 is blow moulded from a material such as Hytrel®, and rib 84 is formed during the formation of boot 60.

Figure 4:
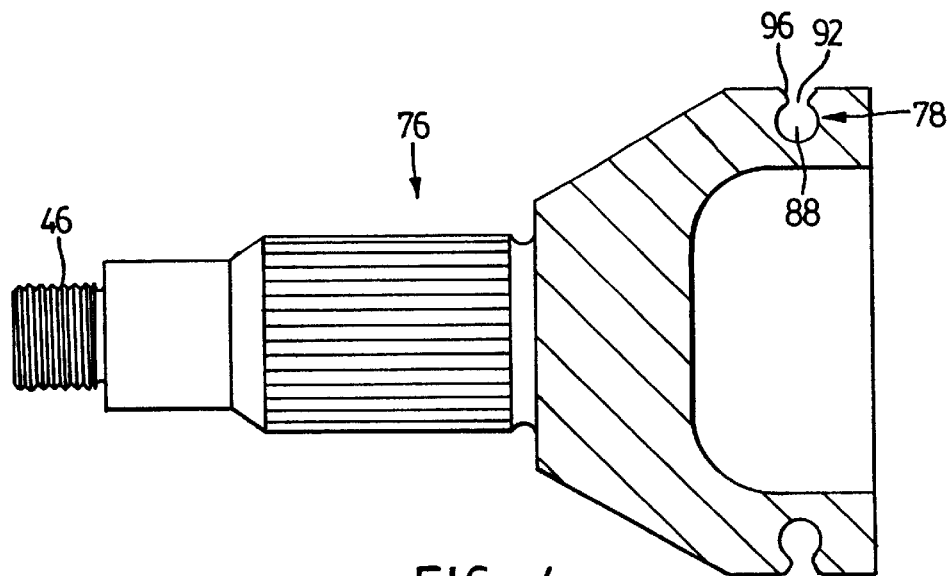
FIG. 4 is a sectional view of the wheel side member of the CV joint shown in FIG. 3.
Figure 5:
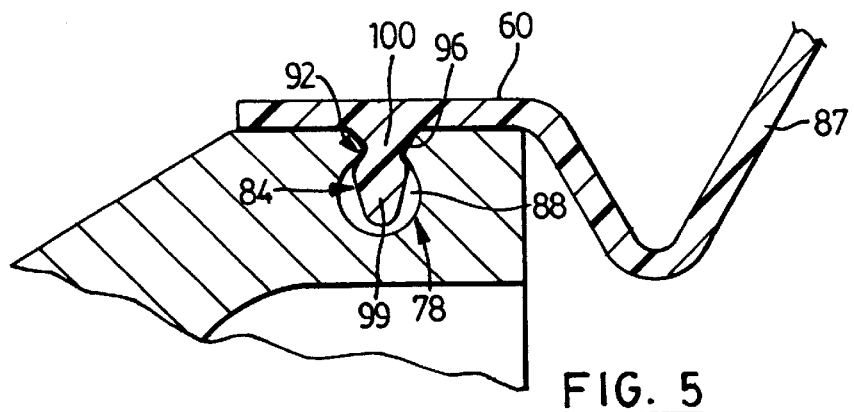
FIG. 5 is a partial sectional view of the universal joint and boot assembly.

The complementary structure of groove 78 and rib 84 is shown in greater detail with reference to FIGS. 4 and 5. Turning first to FIG. 4, groove 78 comprises a wide portion 88, defined in cross-section by an open circle, and narrow portion 92 at the surface of the open circle defining wide portion 88. In the present embodiment, narrow portion 92 is provided with a chamfer 96. Turning next to FIG. 5, which shows a partial sectional view of universal joint and boot assembly 34, rib 84 is shown assembled with groove 78. Rib 84 comprises a head 99, defined in cross-section by an arrow-shape, which is attached to the inner surface of outer edge 60 of boot 44 via a throat 100. A portion of bellows 87 is shown covering a portion of the surface of second member 76.

The assembly of the components of the present invention will now be described with reference to the above-mentioned embodiment. With reference to FIG. 3, first member 72 of universal joint 36 is inserted into the wide opening of boot 44 defined by outer edge 60, until first member 72 protrudes out of narrow end 82. If necessary, the placement of boot 44 is adjusted so as to align rib 84 with groove 78. Turning to FIG. 5, the apex of head 99 mates with chamfer 96 to assist in the placement of rib 84 in the middle of narrow portion 92. Next, inward circumferential pressure is applied to the exterior of outer edge 60. Head 99 is deformed as it is compressed within narrow portion 92. In this embodiment, compression is facilitated by the complementary mating of the apex of head 99 with chamfer 96. Circumferential pressure is applied until head 99 passes through narrow portion 92 and into wide portion 88. Once inserted, head 99 releases to substantially its original shape thus retaining head 99 into wide portion 88. It will be now be apparent that other means may be used to retain rib 84 within groove 78, and that such means do not depart from the scope of the present invention.

Circumferential pressure can be applied manually using the thumb and index fingers of both hands, or automatically using a tool comprising a circular band of spring steel with a means to expand the diameter of the band to encircle outer edge 60 and to decrease the diameter of the band to apply inward circumferential pressure to outer edge 60. Alternately, an automatic tool can comprise two semi-circular jaws each having a radius substantially corresponding with the radius of second member 76. These and other suitable means of applying circumferential pressure will occur to those skilled in the art.

In a present embodiment, narrow end 82 of boot 44 is affixed to first member 72 of universal joint 36 using a conventional clamp 56. However, it will be apparent that clamp 56 could be eliminated by incorporating a second rib into narrow end 82 of boot 44, and providing first member 72 with a complementary, coincident groove to receive the second rib.

During operation of the vehicle, boot 44 protects universal joint 36 from dirt, debris, moisture and other environmental contaminants that can be present on a road, highway or other vehicle driving surface. Further, boot 44 seals the lubricant coating first member 72 and second member 76 from leaking out of universal joint 36. It will also be apparent that universal joint and boot assembly 34 can rotate at high speeds, subjecting boot 44 to strong centripetal forces. At such times, head 99 will be urged against the outer surface of wide portion 88 adjacent narrow portion 92, but will not pass through narrow portion 99 and come out of groove 78, thus sealing the boot. It is believed that such forces can actually improve the seal between outer edge 60 and second member 76 as head 99 is urged against outer edge 60.

Figure 6:
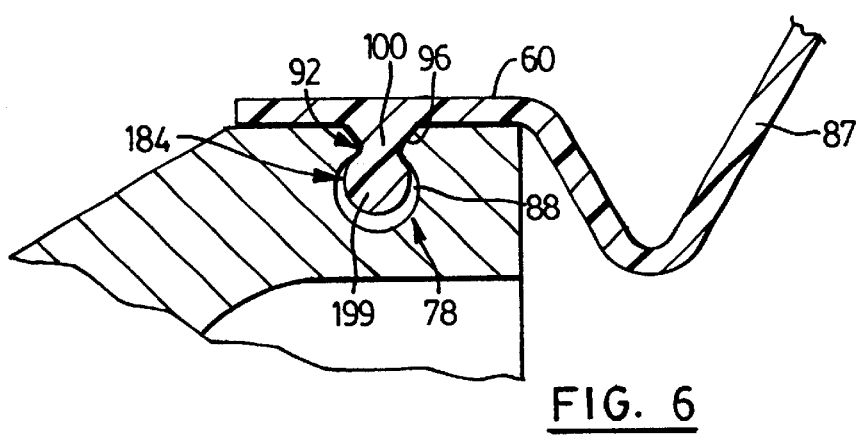
FIG. 6 is a partial sectional view of an alternative embodiment of the universal joint and boot assembly shown in FIG. 5.

FIG. 6 shows a second embodiment of the present invention in a partial sectional view of universal joint and boot assembly 34. Rib 184 is shown assembled with groove 78. Rib 184 comprises a head 199, defined in cross-section by a circle, which is attached to the inner surface of outer edge 60 of boot 44 via a throat 100.

The assembly of the second embodiment can now be described with reference to FIG. 3. First member 72 of universal joint 36 is inserted into the opening of boot 44 defined by outer edge 60, until first member 72 protrudes out of narrow end 82. If necessary, the placement of boot 44 is adjusted so as to align rib 184 with groove 76. Turning to FIG. 6, head 199 is deformed as it is compressed within narrow portion 92, assisted by chamfer 96. Circumferential pressure is applied until head 199 passes through narrow portion 92 and into wide portion 88 and narrow portion 92 surrounds throat 100. Once inserted, head 199 releases to substantially its original shape thus retaining head 199 into wide portion 88. At this point, outer edge 60 of boot 44 is firmly attached to second member 76 of universal joint 36 achieving a 360 degree seal.

It will be apparent that universal joint and boot assembly 34 incorporates the same clampless means of attachment as universal joint and boot assembly 29. It will also be apparent that the present invention could be suited to rack and pinion 24, and other universal joints that are sealed with a boot.

While not shown by way of example herein, it will be appreciated by persons skilled in the art that the present invention encompasses a clampless means of attachment where a rib is provided on the exterior of second member 76, and a complementary groove is provided on the interior of outer edge 60 of boot 44.

It will be apparent from the discussion above that the present invention provides a novel universal joint and boot assembly which eliminates the need for clamps to attach the boot to the assembly and can thereby reducing overall part complexity in the design the cost of the part and the labour cost to assemble it and, in the specific application of CV joints, eliminate the hazard of clamp interference with an ABS sensor. Thus an ABS sensor can be suspended proximate a pair of ABS wheel position rings encircling a CV joint, without being interfered with by a clamp. It will also be apparent that, while presently preferred embodiments of the present invention are described herein, variations and modifications will occur to those skilled in the art and should not be considered as departing from the spirit of the invention.

I claim:

1. A universal joint and boot assembly comprising:
    a first and second member engaging one another to transmit torque therebetween;
    a boot for sealing engagement between said first and second members,
    said boot having a flexible hollow body; and,
    complementary rib and groove members extending radially between said first member and an inner surface of said boot for sealingly connecting said first member to said boot;
    said groove defining a narrow throat at an entry thereto and a wide portion distal said throat;
    said rib having a narrow neck portion for registering with said throat and a wider head portion for registering with said wide portion, said head portion further having a tapered surface distal said neck portion which narrows away from said wider portion and said neck portion for facilitating insertion of said rib into said groove in a radial direction.

2. The universal joint assembly of claim 1 wherein said universal joint is a constant velocity joint.

3. The universal joint of claim 1 wherein:
    said neck portion of aid rib is rectilinear and said head is arrow-shaped.

4. The universal joint of claim 1 wherein:
    said neck portion of said rib is rectilinear and said head is cylindrical.

5. The universal joint of claim 1 wherein said universal joint is a universal joint on a rack and pinion steering system.

6. A boot for sealing a universal joint having a first and second member for transmitting torque therebetween, said first member having a radially extending circumferential groove, said boot comprising:

a flexible hollow body; and a continuous rib extending radially inwardly from an inner surface of said body, said rib being coincident with said groove when said boot is positioned on a universal joint and said rib cooperates with said groove to maintain said boot in position thereon, said rib having a narrow neck portion adjacent said inner surface, a wider head portion adjacent said neck portion, said head portion having a tapered surface distal said neck portion which narrows away from said wider portion.

* * * * *